United States Patent [19]

Ordell

[11] Patent Number: 4,969,744
[45] Date of Patent: Nov. 13, 1990

[54] OPTICAL ANGLE-MEASURING DEVICE

[75] Inventor: Erik Ordell, Alingsås, Sweden

[73] Assignee: Polymetric AB, Alingsås, Sweden

[21] Appl. No.: 326,569

[22] PCT Filed: Jun. 30, 1988

[86] PCT No.: PCT/SE88/00363
§ 371 Date: Feb. 28, 1989
§ 102(e) Date: Feb. 28, 1989

[87] PCT Pub. No.: WO89/00674
PCT Pub. Date: Jan. 26, 1989

[30] Foreign Application Priority Data

Jul. 16, 1987 [SE] Sweden ............... 8702890-8

[51] Int. Cl.$^5$ ............................................. G01B 9/02
[52] U.S. Cl. ................................. 356/352; 356/363
[58] Field of Search ......................... 356/352, 363

[56] References Cited

U.S. PATENT DOCUMENTS 4,558,950 12/1985 Ulrich et al.

FOREIGN PATENT DOCUMENTS 504080 2/1976 U.S.S.R. ............................... 356/363

Primary Examiner—Davis L. Willis
Assistant Examiner—Matthew W. Koren
Attorney, Agent, or Firm—Burns, Doane, Swecker & Mathis

[57] ABSTRACT

A plane-parallel plate (E) is irradiated with coherent light from a laser and an interference pattern observed on a screen (S) and imaged on a multi-channel, position defining detector (D). The interference pattern will move when the plate (E) is rotated about its axis. There is thus provided a highly sensitive angle-measuring device with which measurements can be made to fractions of a second of arc.

14 Claims, 4 Drawing Sheets

OPTICAL ANGLE-MEASURING DEVICE

The present invention relates to an optical device for measuring an angle between a beam of light and a measuring device.

The most common method of measuring angles is probably with the aid of a circular scale whose graduations are observed in one way or another. Automatic systems which operate on the basis of this principle are also to be found. Another principle is one which is based on reflecting light from a rotatable mirror onto a scale and observing the scale with the aid of a telescope and the mirror, this method being invented by Poggendorff in 1829. A third method is the auto-collimation method.

The present invention, however, relates to an interferometric method which approaches the principle of the so-called interference for equal inclinations named after Haidinger (1795-1871) and applied by Fabry and Perot in the interferometer named after these people and used for measuring wavelengths accurately. Although this method has certain complications, of which more will be said in the following, the theory which lies behind these known interferometers can be used to explain the present invention.

The theory of this interferometer has been relatively well developed over the past 80 years. An etalon comprising two partially reflecting and precisely parallel surfaces is irradiated on one side with the light to be studied and an optical system located on the other side enables the intensity of transmitted light to be studied in mutually different directions, this system in the simplest of cases comprising a positive lens and a screen positioned at the focal point of the lens. A number of interference rings will then appear on the screen, where the innermost ring corresponds to a wavelength which depending on the contribution afforded by the size of the ring, essentially coincides with the number of half wavelengths of the light making up the thickness of the etalon. The theory of the Fabry-Perot etalon is described, for instance, by Born & Wolf in "Principles of optics", 6th ed., 1980, chapters 7.5-7.6. and by Tolansky in, inter alia, "An introduction to interferometry".

In the case of such interferometric methods as these it is the innermost interference rings that are of interest. The invention instead preferably utilizes higher order interferences, which can be studied when the etalon is turned away from its conventional position in which the incident light is normal to the plane of the etalon. In contradistinction to the conventional Fabry-Perot interferences, the fringes which can then be observed are essentially vertical lines and with regard to terminology can be more precisely termed as Haidinger fringes or "fringes for equal inclination".

Interferometric measuring processes for measuring lengths or distances are known generally to the art. Reference can be made in this respect to, for instance, the Michelson interferometer and similar constructions which, due to the advent of the laser with its great coherence length, can be also used in practice to measure relatively long distances. Two Fabry-Perot etalons which are moved relative to one another in mutually parallel relationship have also been used to this end: cf. U.S. Pat. No. 4,558,950. The present invention, however relates to the use of a corresponding etalon as an angle detector, wherewith the Haidinger fringes which are obtained with rotation form a kind of natural "scale lines" moving past a detector. These "scale lines" define a monotonous but non-linear scale for defining the rotation of a plane-parallel plate in relation to a light cone projected from a laser device.

In the case of a standard Fabry-Perot interferometer, the space between the two partially reflecting surfaces is air, implying that each of the surfaces is carried by a respective slightly wedge-shaped glass plate. However, since the absolute value of the wavelength is of no interest in the case of the present invention, there is preferably used a plane-parallel glass plate, such plates being commercially available and used as interference filters. In certain cases very thick glass plates are also used e.g. plates having a thickness in the order of 100 mm, since the angular resolution is then very high. As will become apparent from the following description, precise parallelism is less important in the present case than in the case of a Fabry-Perot interferometer.

The principle under which fringes are produced is illustrated in FIG. 1. An incoming beam of light rays (only one ray has been shown), subsequent to refraction in the surface of the plate 1 (the index of refraction outside no being close to 1 in air, and the index of refraction in the plate being n') is repeatedly reflected or transmitted and gives rise to an outgoing beam of light rays which will amplify one another at certain angles $\theta$, $\theta'$. Elementary geometric conditions show that when the plate has a thickness h and the vacuum wavelength of the monochromatic light is $\lambda 0$ the phase difference (in radians) between two successive light rays will be $$\delta = \frac{4\pi}{\lambda 0} n' h \cos\theta' \tag{1}$$

or, as a function of the angle of incidence $\theta$ $$\delta = \frac{4\pi h}{\lambda 0} (n'^2 - \sin^2\theta)^{\frac{1}{2}} \tag{2}$$

Constructive interference is obtained when $\delta = m \cdot 2\pi$, where m is the order of interference (in integers). The angle $\theta$ is obtained from this relationship as a function of the order of interference in accordance with the expression $$\sin\theta = \sqrt{n'^2 - \frac{m\lambda 0^2}{2h}} \tag{3}$$

The angle between two successive fringes $$\Delta\theta = \theta m - \theta m - 1 \tag{4}$$

can be obtained from the preceding expressions. The expression (3) shows that there is a non-linear but monotonous relationship between the angle $\theta$ and the order number m. The order number m has, naturally, a high value. For instance, when h=10 mm, $\lambda 0 = 632$ nm and n'=1.5, the lowest value of m at which a fringe can be observed or discerned will lie in the region of 47,000.

A measure of the distance $\Delta\theta$ between mutually adjacent fringes can be obtained through derivation of the equation (3):

$$\Delta\theta \simeq \frac{\lambda 0 m}{2h} \cdot \frac{1}{\sin 2\theta} \tag{5}$$

With regard to θ, the derivative of this expression is (−1/sine θ).

It will readily be seen that the angle between two fringes will vary widely between near normal incidence, where said angle will be very large, and a grazing angle of incidence, where said angle will be much smaller. However, scale changes are relatively moderate in the case of angles which deviate from normal incidence. Furthermore, the interference fringes which lie close to normal incidence are bent and consequently have no useful purpose with regard to measurements In the case of representative embodiments of the invention, this may mean a jump in the detection of angles within the range, e.g. of $-5°<\theta<+5°$. With an interference plate of 10 mm in thickness a typical interval of 30 arc seconds between 10° and 60° can be expected. The angular resolution that can be achieved depends on the detector used. If this detector has one or two components or elements the angular resolution will accordingly be of the same order of magnitude. A linear detector which has a high resolving power, can increase the resolution by a factor of 500, provided that there is sufficient visibility. This assumes, however, among other things, very narrow lines. The possibility of interpolation is poorer when a laser diode is used, although a resolution of 30 arc seconds can still be obtained with relative ease.

Visibility is contingent on the reflectiveness of the reflecting surfaces—the higher the reflectivity the narrower the fringes. With a reflectivity of 90% there is obtained $20°<\theta<50°$, and with a plate thickness of 12.7 mm a fringe width corresponding to 2 arc seconds.

The aforesaid drawback concerning poor observation possibilities at normal and near normal incidence can be overcome in accordance with one embodiment of the invention, by protecting two different laser beams onto the etalon, so that the beams will impinge thereon at mutually different angles. By arranging two lasers with a fixed angular laser-beam relationship of, e.g., 45° and providing for each laser a respective fringe detector for transmission and detectors in reflection for detecting direct reflection, such as accurate calibration detectors and like limit switches between the two beam paths, it is possible to maintain high resolution and to measure angles continuously from 0° to 360°.

The principle of the invention has been described with a starting point from conditions which relate to the theoretically well-known Fabry-Perot interferometer. The conditions which prevail in practice however are more complicated. Seen theoretically. Haidinger fringes are fringes at infinite distance, which can thus only be discerned when parallel beams have been focused to spots on a screen. In the case of the inventive arrangement however the observed fringes can be viewed directly on a screen and, by positioning the screen obliquely, the fringes can be made sharp but with increased mutual spacing therebetween. An advantage is therefore afforded when such a screen is positioned at an angle which corresponds to the grazing incidence ($\approx 85°$) of the outgoing beam and place an image thereof on a multi-channel or otherwise position-sensitive electric detector. Presumably, the reason why the fringes discerned when practising the invention do not lie at infinite distances, in accordance with the classic theory but can be captured on a screen at any distance, is because the light source used is a laser. Earlier theories namely rely on the supposition that light sources which are not punctiform must be considered to be composed of mutually incoherent, punctiform light sources. A laser, on the other hand, produces so-called non-localized interference fringes.

As beforementioned, a mutual fringe spacing or distance of 30 seconds of arc can be obtained with a plate thickness as small as 10 mm which with the aid of a position-sensitive detector is able to provide positive interpolation of the position to within 500-parts thereof, corresponding to six hundreths (6/100ths) of one second of arc. With regard to the fact that a good circular scale normally graduated with divisions equal to five (5) minutes of arc, will give an accidental measurement error of 0.2–0.5 seconds of arc but a systematic divisional error of 1–3 seconds of arc (Kohlrausch, "Praktische Physik", Stuttgart 1968, page 109) it is apparent that the invention makes possible a reproducible angular measurement which is at least one order of magnitude better than that obtained with the best known classical method, and that calibration to achieve the same accuracy as the reproducibility is a laborious task. Such accuracy is not always necessary, however, and the invention can also be applied for much lower degrees of precision. Thus, if the etalon is given a smaller thickness and the fringe distance consequently made larger, a simple measuring instrument can be used in cases of lower accuracies, therewith enabling the system to be readily automated.

Interpolation between fringes can also be obtained in the abscence of a position detecting detector, by instead rotating the etalon through small angles of known values. For example, the etalon can be caused to rotate at a constant speed of rotation while using a series of synchronous clock pulses in conjunction therewith, which pulses can be utilized for the purpose of interpolation.

Although the inventive device can be considered primarily as a goniometer, it is possible to apply the inventive principle to the construction of other kinds of instruments and measuring devices. For example, the invention can be applied in the construction of a contactless distance measuring device.

In the case of a first type of distance meter, a laser beam is caused to impinge on an object whose position in the direction of the beam is to be determined. The impinged spot emits radiation in different directions. The etalon is slightly offset in relation to the laser beam and the irradiated spot on the object is permitted to constitute the radiation source of the etalon, whereby the angle of radiation can be determined and, by "triangulation", therewith the desired distance.

In the case of a second type of distance measuring device there is used for measuring purposes a separate light beam whose direction of incidence is measured by rotating the etalon arranged in the laser beam until the measuring light beam, through reflection on the etalon, can be brought into coincidence with a fixed light detector, wherewith the rotational angle of the etalon is determined.

According to one particular embodiment of the invention, two angularly displaced etalons may be used therewith enabling an angular range of 0°–360° to be covered.

The invention will now be described with reference to nonlimiting exemplifying embodiments illustrated in the accompanying drawings.

FIG. 1, described above, illustrates the principle of the angle-dependent interferences on which the invention is based.

Figure 1:
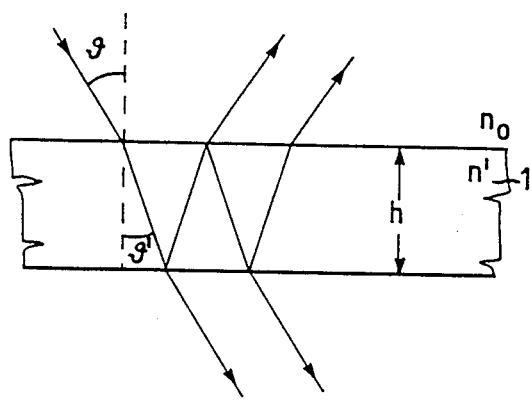
Figure 2:
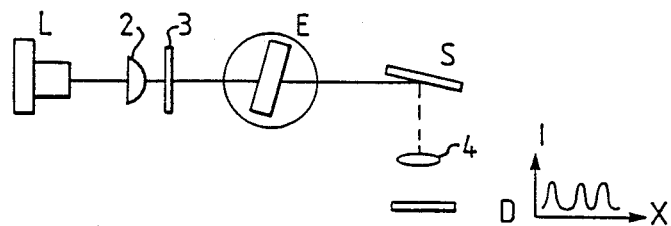
FIG. 2 is a schematic illustration of an angle measuring goniometer.

The principle according to which measurement is effected has been described in the aforegoing, with particular reference to FIG. 1. FIG. 2 illustrates highly schematically a goniometer which functions in accordance with the invention. A laser L emits a beam of coherent light which passes through a lens 2 and an aperture 3 and impinges on a rotatable etalon E, the angle of rotation of which is to be measured. A beam of light passing through the etalon E is caught on an obliquely positioned screen S. Produced on the screen are visually discernible interference fringes which can be imaged on a detector D, preferably a position sensitive detector, with the aid of a lens 4. Various kinds of suitable detectors are known to the art, e.g. diode arrays. As illustrated to one side of the detector D, an intensity distribution with peaks and troughs is obtained. The extent to which the fringes can be observed, corresponding to the sharpness of their intensity distribution, is contingent on the reflectivity of the etalon surfaces.

In the case of a tested etalon having a thickness of 12.7 mm and a reflectivity of 90%, the corresponding fringes had a width of ca 2″ at incident angles of 20°–50°, and a mutually spacing of ca 30″. By positioning the screen S obliquely, the 30″ spacing can be broadened to about 3 mm prior to detection. Interference plates with thicknesses of 1–25 mm and diameters of 1–100 mm are preferred generally.

Low reflectivity makes it difficult to obtain fringes which are sufficiently rich in contrast, particularly at angles beneath about 30°. Consequently, in the case of transmission. reflectivities of 60–99.9% are preferred in general. However, fringes can also be studied in reflection, although at lower intensity, it being possible, however, to observe fringes at a much lower reflectivity (4%). Large angles of incidence produce poor intensity in the case of reflection when R=4%, and consequently it is generally preferred to work with transmission through the etalon. In the case of transmission, the fringe detector may be stationarily mounted relative to the axis of the etalon, since the optical axis moves only some mm when the etalon is rotated.

Figure 3:
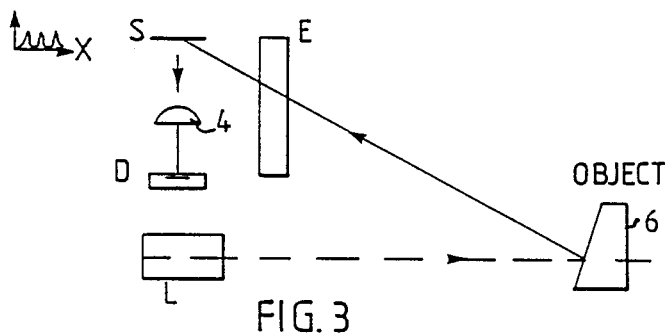
FIG. 3 illustrates a first distance measuring application.

FIG. 3 illustrates one application in the measurement of distances. A laser beam generated by the laser L is directed onto an object 6 whose position along the beam is to be determined. The object 6 will emit light from a small irradiated spot, this light impinging on the etalon E at an angle clearly defined by the position of the object. Similarly to manner described with reference to FIG. 2, interference fringes are caught on an inclined screen S, which is projected onto the position sensitive detector D. It will readily be seen that changes in the distance between the laser L and the object 6 can be measured, by observing the number of fringes which move past on the screen S. When considering the matter trigonometrically, it will also be seen that the decrease in the spacing between successive fringes with increasing angles of incidence is compensated for considerably by the fact that the change in angle over a given movement path in mm becomes progressively smaller the farther the object 6 is moved away from the laser, implying a compensating effect in a linearizing direction.

Figure 4:
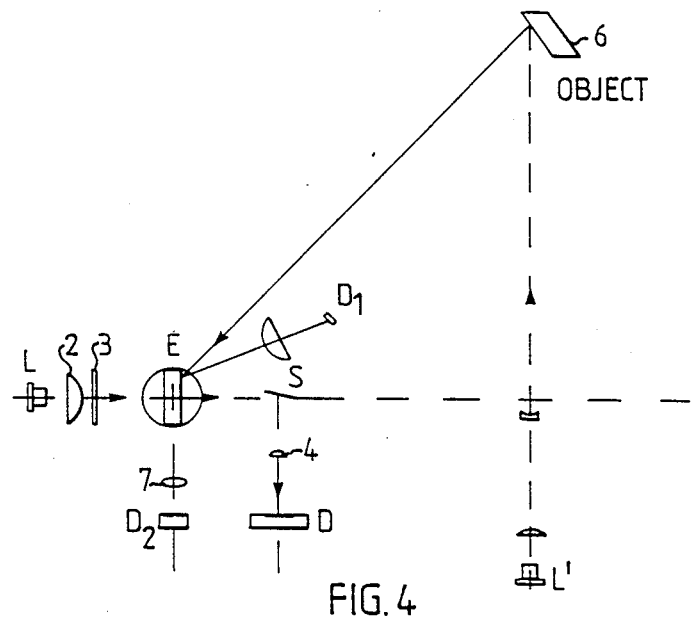
FIG. 4 illustrates a second distance measuring application.

FIG. 4 illustrates a further application for defining distances, in which two lasers L and L' are used. In the case of the embodiment illustrated in FIG. 3 it is necessary, with regard to intensity that the object reflects a great deal of the irradiating laser beam. In the case of the FIG. 4 embodiment, however, the object is irradiated with a fixed laser L' and the etalon E is used as a mirror, to reflect light onto a detector D1, rotation of the etalon being effected through a servo-mechanism not shown. This rotation of the etalon E is measured with the aid of a laser beam produced by a further fixed laser L. which subsequent to transmission gives rise to fringes on the screen S. In this case, the combination of the laser L the etalon E and the screen S with the detector D functions purely as a goniometer, which produces a result similar to that produced by a conventional circular scale. The illustrated goniometer, however, is also particularly suitable for the automatic recording of data. For the purpose of obtaining a reference angle, the etalon E is suitably provided with a reference mark which can be observed with the aid of a detector D2 through a lens system 7. This system may instead be an auto-collimation system.

Figure 5:
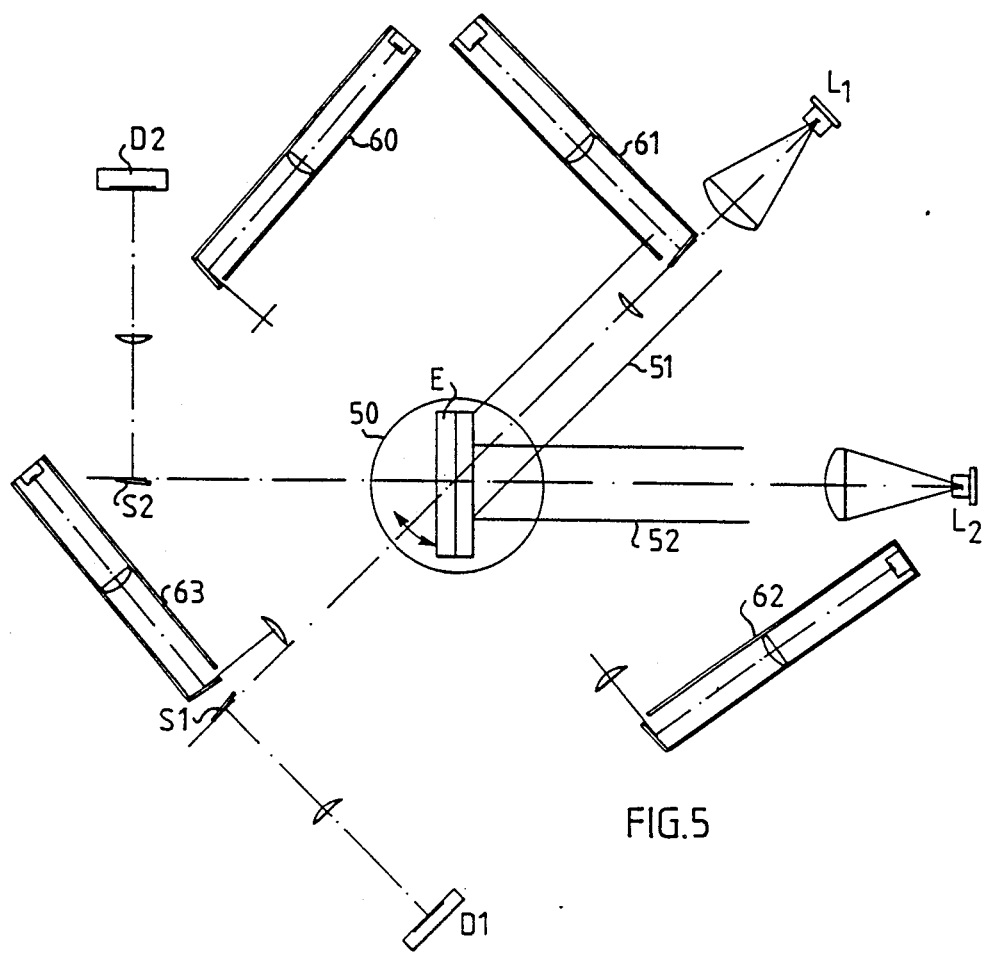
FIGS. 5 and 6 illustrate a further development of an angle measuring arrangement.
Figure 6:
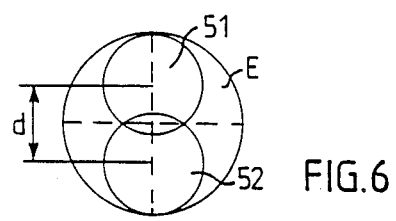

FIGS. 5 and 6 illustrate a more complete goniometer. The etalon E of this embodiment is irradiated with two laser beams 51, 52, from respective lasers L1, L2. The beams define therebetween an angle of 45° and are displaced vertically through a distance d as shown in FIG. 6. The interference fringes in the two transmitted beams are caught on screens S1, S2 and are studied with fringe detectors D1 and D2. The goniometer also includes four reflection detectors 60–63, each of which has a screen, an objective and a light detector and which are placed in the plane of the beam 52.

Figure 7:
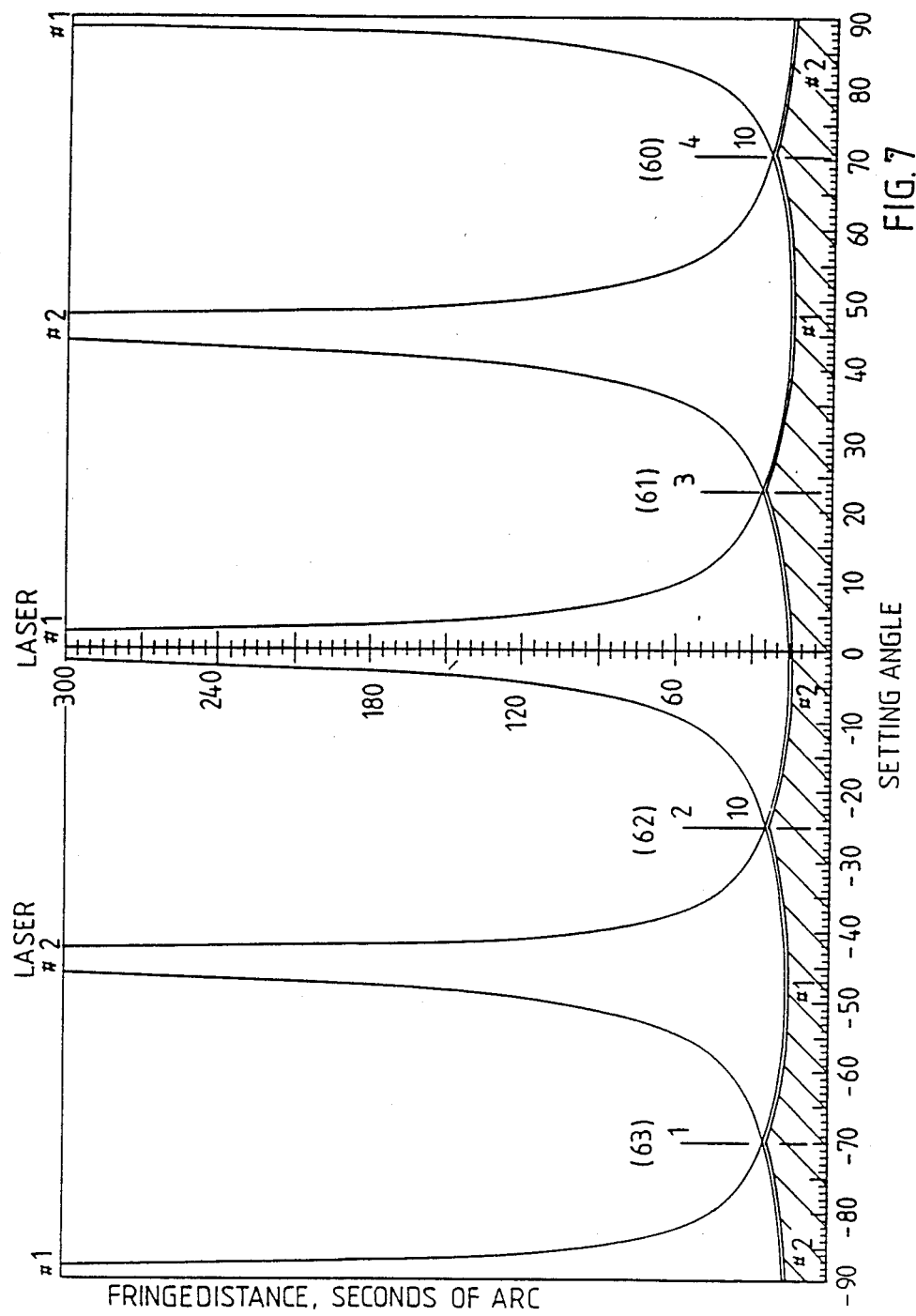
FIG. 7 illustrates how the spacing between fringes varies with the angle, with particular application on the example illustrated in FIGS. 5 and 6.

The angular distance between two mutually adjacent fringes is namely quite large at a 90° angle of incidence and varies considerably with said angle. Furthermore, if the fringes are to be visible, the two surfaces of the etalon E must be highly parallel with one another. Moreover, the fringes are bent. Consequently, these angles are to be avoided and the interval is split up between the two laser beams/detector arrays. Switching is effected by means of the detectors 60–63. In the FIG. 5 illustration the goniometer is assumed to have a setting of 0° (cf. FIG. 7) and that the laser beam 51 is detected with the aid of S1 and D1 at an angle of incidence of 45°. The laser beam 51 will be normal to the etalon when the table 50 is rotated through 45° in the positive sense (anti-clockwise). However, the beam 52 will impinge on the detector 61 prior to this, after rotating the table in the positive sense through 22.5°, wherewith detection is switched from the beam 51 to the beam 52. Similarly, rotation in the negative sense through 22.5° will result in reflection of the beam 52 onto the detector 62, for a corresponding switch. Correspondingly, at a positive angle of 67.5° the beam 52 will activate the detector 60, whereas at a negative angle of roughly 67.5° said beam 52 will be reflected onto the detector 63. Other detector configurations are, of course, conceivable, the main thing being that the switch from one beam to the other is made at angles which ensure that the near normal angles of incidence on the etalon E are avoided. FIG. 7 illustrates how the fringe spacing can be kept below 30" and shows the positions at which the switches are made.

This shows that the inventive principle can also be applied with a goniometer which rotates a full circle, despite the difficulties encountered with normal incidence (Strictly speaking the described signal sequence only covers angles of up to 180°, but, as will be understood, the detectors 60-63 enable measurements to be made over a full revolution and even over several revolutions.)

Because it is possible to use rapid detectors which can be evaluated in a known manner to determine the direction of the passage of the interference fringes, the purely mechanical difficulties concerning the journalling of the rotatable etalon can be overcome, so as to enable the angular resolution afforded by the interferometric method to be utilized in practice. Furthermore the angle of rotation can be measured to a far greater extent than was previously possible, both with regard to precision and to accuracy.

I claim:

1. Angle measuring arrangement for measuring an angle between a beam of electromagnetic radiation and a measuring device, wherein the beam is a coherent monochromatic beam, and wherein the measuring device includes a plane-parallel plate which comprises a medium transparent to the radiation and which is defined by two substantially parallel reflective surfaces, said measuring device further including a position sensitive interference fringe detector for detecting a plurality of multiple beam interference fringes generated in the plane-parallel plate by the coherent light beam.

2. An arrangement according to claim 1, wherein the plane-parallel plate and the position sensitive interference fringe detector are mutually mounted stationarily for measuring the angle of incidence of the light beam on the plane-parallel plate.

3. An arrangement according to claim 2, wherein the plane-parallel plate is made of glass or like material and is provided on mutually opposite sides with a reflective coating having a reflectivity within a range of 60-99.9%.

4. An arrangement according to claim 2, wherein the interference fringe detector includes a screen, which is inclined relative to a line normal to the detector which extends from the screen to the plate, an optical imaging element, and a position-sensitive detector which is located in the screen-imaging plane of said element.

5. An arrangement according to claim 1, wherein the apparatus includes a laser-beam emitting laser and the interference detector which are firmly joined together; and in that the plane-parallel plate is arranged for rotation about an axis which is parallel with the reflective surfaces of the plate and perpendicular to the laser beam.

6. An arrangement according to claim 5, wherein two laser beams are each arranged in respective planes which are mutually displaced in the direction of the rotational axis of the plate; in that interference fringe detectors are provided for detecting interference fringes generated by respective laser beams; and in that means are provided for detecting respective interference fringes within predetermined intervals under avoiding intervals at which respective laser beams impinge on the plate at near normal angle of incidence and at grazing angles of incidence.

7. An arrangement according to claim 6, wherein the interference fringe detector includes a screen, which is inclined relative to a line normal to the detector which extends from the screen to the plate, an optical imaging element, and a position-sensitive detector which is located in the screen-imaging plane of said element.

8. An arrangement according to claim 5, wherein the plane-parallel plate is made of glass or like material and is provided on mutually opposite sides with a reflective coating having a reflectivity within a range of 60-99.9%.

9. An arrangement according to claim 5, wherein the interference fringe detector includes a screen, which is inclined relative to a line normal to the detector which extends from the screen to the plate, an optical imaging element, and a position-sensitive detector which is located in the screen-imaging plane of said element.

10. An arrangement according to claim 1 wherein the plane-parallel plate is made of glass or like material and is provided on mutually opposite sides with a reflective coating having a reflectivity within a range of 60-99.9%.

11. An arrangement according to claim 10, wherein the interference fringe detector includes a screen, which is inclined relative to a line normal to the detector which extends from the screen to the plate, an optical imaging element, and a position-sensitive detector which is located in the screen-imaging plane of said element.

12. An arrangement according to claim 1, wherein the interference fringe detector includes a screen, which is inclined relative to a line normal to the detector which extends from the screen to the plate, an optical imaging element, and a position-sensitive detector which is located in the screen-imaging plane of said element.

13. An arrangement according to claim 1, wherein said coherent light beam is a laser beam arranged by means of a laser diode and a lens system is located in front of said diode.

14. An arrangement according to claim 1, further including a detector means for establishing a reference position for the rotatable pate.

* * * * *